US012669987B2

(12) United States Patent
Lian et al.

(10) Patent No.: US 12,669,987 B2
(45) Date of Patent: Jun. 30, 2026

(54) INTELLIGENT PORT MAPPING METHOD FOR WSL2 SYSTEM

(71) Applicant: Guangdong Baolun Electronics Co., Ltd., Guangzhou (CN)

(72) Inventors: Hengkai Lian, Guangzhou (CN);
Changhua Zhang, Guangzhou (CN);
Zhenghui Zhu, Guangzhou (CN);
Dingjin Zhao, Guangzhou (CN)

(73) Assignee: GUANGDONG BAOLUN ELECTRONICS CO., LTD., Guangzhou (CN)

( * ) Notice: Subject to any disclaimer, the term of this patent is extended or adjusted under 35 U.S.C. 154(b) by 292 days.

(21) Appl. No.: 18/647,796

(22) Filed: Apr. 26, 2024

(65) Prior Publication Data

US 2024/0272889 A1 Aug. 15, 2024

Related U.S. Application Data

(63) Continuation of application No. PCT/CN2022/077427, filed on Feb. 23, 2022.

(30) Foreign Application Priority Data

Nov. 23, 2021 (CN) .......................... 202111389622.4

(51) Int. Cl.
G06F 8/61 (2018.01)
H04L 67/1097 (2022.01)
(52) U.S. Cl.
CPC ............ G06F 8/61 (2013.01); H04L 67/1097 (2013.01)
(58) Field of Classification Search
CPC ...... G06F 8/61; G06F 13/404; G06F 11/3471; G06F 9/00
See application file for complete search history.

(56) References Cited

U.S. PATENT DOCUMENTS 9,606,900 B1 3/2017 Pradhan et al.
2022/0191163 A1* 6/2022 Loefstrand .......... H04L 61/5007

FOREIGN PATENT DOCUMENTS

CN 112291377 A 1/2021
CN 112363985 A 2/2021
(Continued)

OTHER PUBLICATIONS

Useful snippets / tools for using WSL2 as a development environment Updated based on issue #7 guidance from '@scotte' and '@JohnTasto', https://github.com/shayne/wsl2-hacks (Year: 2020).*
(Continued)

*Primary Examiner* — Hyun Soo Kim
(74) *Attorney, Agent, or Firm* — MUNCY, GEISSLER, OLDS & LOWE, P.C.

(57) ABSTRACT

An intelligent port mapping method for a WSL2 system, including: installing a WSL2 subsystem and a BAT script, setting the WSL2 subsystem and the BAT script as automatic starting, and initializing a computer; a WSL2HOST service monitoring whether the IP of the WSL2 subsystem has changed, and if yes, writing a new IP address into a hosts file, used for domain name-IP address mapping relation management, in a Windows 10 system; the BAT script reading file data in the hosts file every m seconds, analyzing, according to the read file data, whether the IP address recorded by a host where the Windows 10 system is located has changed; and the BAT script mapping, according to the new IP address, all ports required by a WSL subsystem service to complete port mapping.

4 Claims, 1 Drawing Sheet

(56) References Cited

FOREIGN PATENT DOCUMENTS

| | | | | |
|---|---|---|---|---|
| JP | 2022180763 | A | * | 12/2022 |
| WO | WO-2022108363 | A1 | * | 5/2022 ......... G06F 9/45558 |

OTHER PUBLICATIONS

Heei. "WSL and Win10 fixed host access each other" https://www.cnblogs.com/heei/p/15407237.html, Oct. 14, 2021 (Oct. 14, 2021), full text of the webpage, 6 pages.

Dayutian. "Solution to the problem that the WIN 10 WSL2 IP address frequently changes, causing the docker container to be unable to access normally", https://blog.csdn.net/kfeng632/article/details/105979109/.

Icode9. "WSL2 and Win10 fixed host access each other" https://www.icode9.com/content-4-1178375.html, Oct. 14, 2021, 4 pages.

Tutorial for coders. "Mutual access between WSL2 and Win 10 fixed host" http://www.manongjc.com/detail/26-ndzsijyksioeoht.html, Oct. 14, 2021, 6 pages.

Press the road. "WSL2 Set Port Mapping" https://blog.csdn.net/keyils_sh/article/details/113819244, Feb. 15, 2021, 2 pages.

Xueliang Programming Notes. "WSL port mapping to WIN" https://blog.csdn.net/a772304419/article/details/120172587?utm_medium=distribute.pc_relevant.none-task-blog-2~default~baidujs_baidulandingword~default-0.pc_relevant_default&spm=1001.2101.3001.4242.1&utm_relevant_index=3, downloaded on Apr. 19, 2024, 2 pages.

* cited by examiner

Step 1: installing a WSL2 subsystem and a BAT script in a target Windows 10 system, setting the WSL2 subsystem and the BAT script as automatic starting, and initializing a computer Step 2: a WSL2HOST service monitoring whether the IP of the WSL2 subsystem has changed; if yes, writing a new IP address into a hosts file, used for domain name-IP address mapping relation management, in the Windows 10 system and performing step 3; and if not, continuing the monitoring Step 3: the BAT script reading file data in the hosts file every m seconds, analyzing, according to the read file data, whether the IP address recorded by a host where the Windows 10 system is located has changed; if yes, performing step 4; and if not, reading the file data in the hosts file after resting for n seconds Step 4: the BAT script mapping, according to the new IP address, all ports required by a WSL subsystem service to complete port mapping between the WSL2 subsystem and the Windows 10 system

INTELLIGENT PORT MAPPING METHOD FOR WSL2 SYSTEM

CROSS REFERENCE TO RELATED APPLICATIONS

This application is a Continuation of co-pending International Application No. PCT/CN2022/077427, filed on Feb. 23, 2022, for which priority is claimed under 35 U.S.C. § 120; and this application claims priority of Application No. 202111389622.4 filed in China on Nov. 23, 2021 under 35 U.S.C. § 119; the entire contents of all of which are hereby incorporated by reference.

TECHNICAL FIELD

The present application relates to the technical field of port mapping under Windows systems, and particularly relates to an intelligent port mapping method for a WSL2 system.

BACKGROUND

WSL is a Windows subsystem suitable for Linux in a Windows 10 system, is a newly added function in the Windows 10 system, and is mainly used for running a native Linux system and commands directly in the Windows 10 system. WSL2 is a new version of WSL, and is also the latest version at present, which supports Windows subsystems suitable for Linux to run ELF64 Linux binary files on Windows in order to improve performance of a file system and increase full compatibility of system calls.

However, many defects are found in the use of the WSL2 subsystem, mainly including that the IP address of the WSL2 subsystem changes every time when the WSL2 subsystem is restarted, which directly causes invalidity of the port mapping between the WSL2 subsystem and the Windows 10 system, and thereby causes that all services in the WSL2 subsystem become unavailable. Therefore, human intervention is needed to search for a new IP address and re-execute a mapping script for the new IP address to establish a new port mapping relation, which is very tedious and troublesome in actual use. For this reason, a better and more intelligent port mapping method is needed.

SUMMARY

In view of the defects in the prior art, the purpose of the present application is to provide an intelligent port mapping method for a WSL2 system, which can solve the problem of automatically establishing new port mapping after the system is restarted.

A technical solution to realize the purpose of the present application is: an intelligent port mapping method for a WSL2 system, comprising the following steps:

Step 1: installing a WSL2 subsystem and a BAT script in a target Windows 10 system, setting the WSL2 subsystem and the BAT script as automatic starting, and Initializing a computer;

Step 2: a WSL2HOST service monitoring whether the IP of the WSL2 subsystem has changed; if yes, writing a new IP address into a hosts file, used for domain name-IP address mapping relation management, in the Windows 10 system and performing step 3; and if not, continuing the monitoring;

Step 3: the BAT script reading file data in the hosts file every m seconds, analyzing, according to the read file data, whether the IP address recorded by a host where the Windows 10 system is located has changed; if yes, performing step 4; and if not, reading the file data in the hosts file after resting for n seconds;

Step 4: the BAT script mapping, according to the new IP address, all ports required by a WSL2 subsystem service to complete port mapping between the WSL2 subsystem and the Windows 10 system.

Further, after completing step 4, performing step 3 again, and monitoring whether the IP address has changed for the next time to realize dynamic port mapping when the IP address has changed.

Further, in step 3, analyzing an analytic record of a debian.wsl fixed host in the hosts file to judge whether the IP address has changed.

Further, $m=3$, and $n=10$.

The present application has the following beneficial effects: the present application is simple to deploy, which only needs to install the WSL2 subsystem and the BAT script in the target Windows 10 system; the WSL2 subsystem is steadily used in actual production, which only needs to write the monitored new IP address into the hosts file; and the present application can achieve true unattended operation and has good stability.

DESCRIPTION OF DRAWINGS

The sole FIGURE is a flow chart of the present application.

DETAILED DESCRIPTION

To make the purpose, the technical solutions and the advantages of the present application more clear, specific embodiments of the present application are further described below in detail in combination with drawings. It should be understood that the specific embodiments described herein are only used for explaining the present application, not used for limiting the present application. In addition, it should be noted that for ease of description, the drawings only show some portions related to the present application rather than all portions. Before exemplary embodiments are discussed in more detail, it should be mentioned that some exemplary embodiments are described as processing or methods depicted as flow charts. Although the flow charts describe various operations (or steps) as sequential processing, many operations can be implemented in parallel, concurrently, or simultaneously. In addition, a sequence of various operations can be rearranged. The processing can be terminated when the operation is completed, but additional steps not included in the drawings can also be possessed. The processing may correspond to methods, functions, procedures, subroutines, subprograms, etc.

As shown in the sole FIGURE, an intelligent port mapping method for a WSL2 system, comprising the following steps:

Step 1: installing a WSL2 subsystem and a BAT script in a Windows 10 system, setting the WSL2 subsystem and the BAT script as automatic starting, i.e., adding the WSL2 subsystem and the BAT script into a self-starting menu bar of the Windows 10 system to enable a WSL2HOST service and the BAT script of the WSL2 subsystem to be started synchronously with the start of the Windows 10 system, and Initializing a computer.

In this step, the WSL2HOST service is set as automatic starting, i.e., the star type of the WSL2HOST service is set to Auto in a service manager of the Windows 10 system, so that the WSL2HOST service can be started synchronously with the start of the Windows 10 system. After the WSL2 subsystem is installed in the Windows 10 system, the WSL2 subsystem is added into the self-starting menu bar of the Windows 10 system, so that the WSL2 subsystem is ensured to be started synchronously when the Windows 10 system is started.

Step 2: the WSL2HOST service monitoring whether the IP of the WSL2 subsystem has changed, and if yes, writing a monitored new IP address into a hosts file, used for domain name-IP address mapping relation management, in the Windows 10 system. If not, continuing monitoring whether the IP of the WSL2 subsystem has changed.

The hosts file of the Windows 10 system is installed in the hosts file under a directory of C:\Windows\System32\drivers\etc by default, and therefore, a new IP address can be quickly written into the hosts file based on the path (i.e., the directory). The hosts file is a built-in file in a Windows system, which is specifically used for recording a mapping relation between a domain name and an IP address corresponding to the domain name.

Step 3: after being started, the BAT script reading file data in the hosts file every a period of time (usually a few seconds), for example, reading the file data in the hosts file every 3 seconds, analyzing, according to the read file data, whether the IP address recorded by a host where the Windows 10 system is located has changed; if yes, performing step 4; and if not, reading the file data in the hosts file after resting for a period of time (usually a few seconds too), for example, reading the file data in the hosts file after resting for 10 seconds.

An analytic record of a debian.wsl (corresponding to the WSL2 subsystem of a debian distribution version) fixed host is recorded in the hosts file.

Step 4: the BAT script mapping, according to the new IP address, all ports required by a debian module service in a WSL subsystem, and performing step 3 after completing the mapping.

Through step 3 and step 4, each new IP address can be read, and port application between the WSL2 subsystem and the Windows 10 system is established by using the BAT script to perform port mapping again. Dynamic port mapping is realized, i.e., each time when the IP has changed, a port required can be automatically mapped to the new IP address, which ensures the permanent use of the WSL2 subsystem in the Windows 10 system, i.e., after a system is restarted, port mapping can be performed automatically without human intervention.

Port mapping can be realized by writing corresponding code in the BAT script, and the key code for realizing port mapping is as follows:

```
netsh interface portproxy add v4tov4 listenport=22
   connectaddress=%myip%
listenaddress=* protocol=tcp
   netsh interface portproxy add v4tov4 listenport=80
   connectaddress=%myip%
listenaddress=* protocol=tcp.
```

The present application is simple to deploy, which only needs to install the WSL2 subsystem and the BAT script in the target Windows 10 system; the WSL2 subsystem is steadily used in actual production, which only needs to write the monitored new IP address into the hosts file; and the present application can achieve true unattended operation and has good stability.

The present application is described with reference to flow charts and/or block diagrams according to a method, device (system) and computer program product in embodiments of the present application. It should be understood that each flow and/or block in the flow charts and/or block diagrams and a combination of flows and/or blocks in the flow charts and/or block diagrams can be realized through computer program instructions. The computer program instructions can be provided for a processor of a general-purpose computer, a special-purpose computer, an embedded processor, or other programmable data processing devices to generate a machine, so that a device for realizing designated functions in one or more flows of the flow charts and/or one or more blocks of the block diagrams is generated through the instructions executed by the processor of the computer or other programmable data processing devices.

The computer program instructions can also be stored in a computer readable memory which can guide the computer or other programmable data processing devices to operate in a special mode, so that the instructions stored in the computer readable memory generate a manufactured product including an instruction device, the instruction device realizing designated functions in one or more flows of the flow charts and/or one or more blocks of the block diagrams.

The computer program instructions can also be loaded on the computer or other programmable data processing devices, so that a series of operation steps are executed on the computer or other programmable devices to generate processing realized by the computer. Therefore, the instructions executed on the computer or other programmable devices provide steps for realizing designated functions in one or more flows of the flow charts and/or one or more blocks of the block diagrams.

Although preferred embodiments of the present application are described, those skilled in the art can make additional alterations and amendments to the embodiments once knowing basic creative concepts. Therefore, the appended claims are interpreted to include the preferred embodiments and all the alterations and amendments which fall into the scope of the present application.

Obviously, those skilled in the art could implement various modifications and variations of the present application without departing from the spirit and scope of the present application. So, the present application is intended to include the modifications and variations if the amendments and variations of the present application belong to claims of the present application and the equivalent technical scope.

What is claimed is:

1. An intelligent port mapping method for a WSL2 system, comprising the following steps:

step 1: installing a WSL2 subsystem and a BAT script in a target Windows 10 system, setting the WSL2 subsystem and the BAT script as automatic starting, and initializing a computer;

step 2: When a WSL2HOST service determines that the IP of the WSL2 subsystem has changed, writing a new IP address into a host file, used for domain name-IP address mapping relation management, in the Windows 10 system and performing step 3;

step 3: the BAT script reading file data in the hosts file every m seconds, analyzing, according to the read file data, whether the IP address recorded by a host where the Windows 10 system is located has changed; if yes, performing step 4; and if not, reading the file data in the hosts file after resting for n seconds;

step 4: the BAT script mapping, according to the new IP address, all ports required by a WSL2 subsystem service to complete port mapping between the WSL2 subsystem and the Windows 10 system.

2. The intelligent port mapping method for a WSL2 system according to claim 1, wherein after completing step 4, performing step 3 again, and monitoring whether the IP address has changed for the next time to realize dynamic port mapping when the IP address has changed.

3. The intelligent port mapping method for a WSL2 system according to claim 1, wherein in step 3, analyzing an analytic record of a debian.wsl fixed host in the hosts file to judge whether the IP address has changed.

4. The intelligent port mapping method for a WSL2 system according to claim 1, wherein m=3, and n=10.

* * * * *